(12) United States Patent
Raz

(10) Patent No.: US 12,518,547 B2
(45) Date of Patent: Jan. 6, 2026

(54) 3D DETECTION SYSTEM FOR IN-CABIN AUTOMOTIVE ERGONOMICS

(71) Applicant: Gentex Corporation, Zeeland, MI (US)

(72) Inventor: Guy Raz, Binyamina (IL)

(73) Assignee: GENTEX CORPORATION, Zeeland, MI (US)

( * ) Notice: Subject to any disclaimer, the term of this patent is extended or adjusted under 35 U.S.C. 154(b) by 56 days.

(21) Appl. No.: 18/398,587

(22) Filed: Dec. 28, 2023

(65) Prior Publication Data

US 2024/0221396 A1    Jul. 4, 2024

Related U.S. Application Data

(60) Provisional application No. 63/435,851, filed on Dec. 29, 2022.

(51) Int. Cl.
*G06V 20/59* (2022.01)
*B60N 2/02* (2006.01)
*B60N 2/56* (2006.01)
*B60Q 9/00* (2006.01)
*B60R 16/037* (2006.01)
(Continued)

(52) U.S. Cl.
CPC .......... *G06V 20/59* (2022.01); *B60N 2/0244* (2013.01); *B60N 2/56* (2013.01); *B60Q 9/00* (2013.01); *B60R 16/037* (2013.01); *B62D 1/065* (2013.01); *G06T 7/521* (2017.01); *G06T 7/593* (2017.01); *G06T 7/73* (2017.01); *G06V 20/52* (2022.01); *G06V 40/103* (2022.01); *H04N 23/56* (2023.01); *G06T 2207/10048* (2013.01); *G06T 2207/10152* (2013.01); *G06T 2207/30196* (2013.01);
(Continued)

(58) Field of Classification Search
CPC .............. G06V 20/59; B60R 21/01552; B60R 21/01538
See application file for complete search history.

(56) References Cited

U.S. PATENT DOCUMENTS

2016/0023665 A1\* 1/2016 Sherony ................. G02B 27/01
701/2
2021/0276501 A1   9/2021 Li et al.
(Continued)

FOREIGN PATENT DOCUMENTS

CN    109353251 A    2/2019
CN    111967432 A    11/2020
(Continued)

*Primary Examiner* — Long T Tran
(74) *Attorney, Agent, or Firm* — Price Heneveld LLP; Brian James Brewer

(57) ABSTRACT

A monitoring system for a vehicle includes an imaging device configured to capture a first image type and a second image type. A first illumination source is configured to emit a flood illumination captured by the imaging device in the first image type. A second illumination source is configured to emit an illumination pattern captured by the imaging device in the second image type. A processor is configured to extract a 2D skeletal representation of a vehicle occupant from the first image type and extrapolate a 3D skeletal representation of the vehicle occupant. The processor is further configured to generate at least one of a communication to the vehicle occupant to change a posture or a signal to a vehicle control system to move at least one of a position of a seat or a position of a steering wheel.

20 Claims, 10 Drawing Sheets

(51) Int. Cl.
  *B62D 1/06*     (2006.01)
  *G06T 7/521*    (2017.01)
  *G06T 7/593*    (2017.01)
  *G06T 7/73*     (2017.01)
  *G06V 20/52*    (2022.01)
  *G06V 40/10*    (2022.01)
  *H04N 23/56*    (2023.01)

(52) U.S. Cl.
  CPC ............... *G06T 2207/30232* (2013.01); *G06T 2207/30268* (2013.01)

(56) References Cited

U.S. PATENT DOCUMENTS

| | | | |
|---|---|---|---|
| 2022/0203996 A1* | 6/2022 | Katz | B60W 50/14 |
| 2023/0154207 A1* | 5/2023 | Qi | G08B 21/06 |
| | | | 382/157 |
| 2023/0166743 A1* | 6/2023 | Heck | G05B 13/027 |

FOREIGN PATENT DOCUMENTS

| | | | |
|---|---|---|---|
| KR | 20200069585 A | 6/2020 | |
| WO | 2018015329 A1 | 1/2018 | |

\* cited by examiner

3D DETECTION SYSTEM FOR IN-CABIN AUTOMOTIVE ERGONOMICS

CROSS-REFERENCE TO RELATED APPLICATION

This application claims priority to and the benefit under 35 U.S.C. § 119(e) of U.S. Provisional Application No. 63/435,851, filed on Dec. 29, 2022, entitled "3D DETECTION SYSTEM FOR IN-CABIN AUTOMOTIVE ERGONOMICS," the disclosure of which is hereby incorporated herein by reference in its entirety.

FIELD OF THE DISCLOSURE

The present disclosure generally relates to a monitoring system, and more particularly to a monitoring system configured to extrapolate a 3-dimensional ("3D") representation of a vehicle occupant and improving posture and ergonomics.

SUMMARY OF THE DISCLOSURE

According to one aspect of the present disclosure, a monitoring system for a vehicle includes at least one imaging device configured to capture a first image type and a second image type in a sequence. A first illumination source is configured to emit a flood illumination captured by the at least one imaging device in the first image type. A second illumination source is configured to emit an illumination pattern captured by the at least one imaging device in the second image type. At least one processor is configured to extract a 2-dimensional ("2D") skeletal representation of a vehicle occupant from the first image type, measure a depth of the 2D skeletal representation with the second image type, and extrapolate a 3-dimensional ("3D") skeletal representation of the vehicle occupant. The at least one processor is further configured to generate at least one of a communication to the vehicle occupant to change a posture or a signal to a vehicle control system to move at least one of a position of a seat or a position of a steering wheel.

According to another aspect of the present disclosure, a monitoring system for a vehicle includes at least one imaging device configured to capture a first image type and a second image type. The first image type includes a 2-dimensional ("2D") capture of a flood illumination on a vehicle occupant. The second image type includes a depth information of the vehicle occupant. At least one processor is configured to extract a 2-dimensional ("2D") skeletal representation of a vehicle occupant from the first image type, measure a depth of the 2D skeletal representation with the depth information, and extrapolate a 3-dimensional ("3D") skeletal representation of the vehicle occupant. The at least one processor is further configured to generate at least one of a communication to the vehicle occupant to change a posture or a signal to a vehicle control system to move at least one of a position of a seat or a position of a steering wheel.

According to yet another aspect of the present disclosure, a monitoring system for a vehicle includes at least one imaging device configured to capture a first image type and a second image type in a sequence. A first illumination source is configured to emit a flood illumination captured by the at least one imaging device in the first image type. A second illumination source is configured to emit an illumination pattern captured by the at least one imaging device in the second image type. At least one processor is configured to extract a 2-dimensional ("2D") skeletal representation of a vehicle occupant from the first image type, measure a depth of the 2D skeletal representation with the second image type, and extrapolate a 3-dimensional ("3D") skeletal representation of the vehicle occupant. The at least one processor is further configured to recognize an orthopedic identifier related to poor posture and generate at least one of a communication to the vehicle occupant to change the poor posture or a signal to a vehicle control system to move at least one of a position of a seat or a signal to a vehicle control system to adjust least one of a seat or a steering wheel.

These and other features, advantages, and objects of the present disclosure will be further understood and appreciated by those skilled in the art by reference to the following specification, claims, and appended drawings.

DETAILED DESCRIPTION

Figure 1:
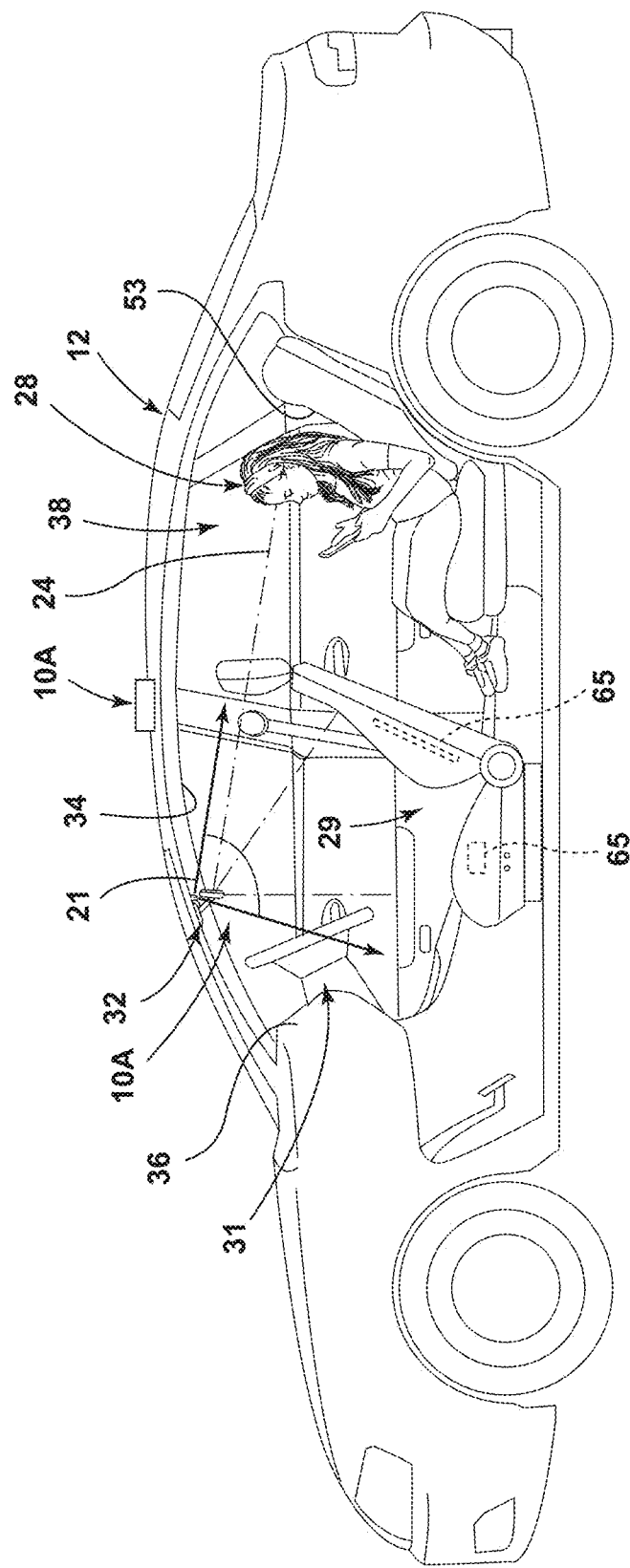
FIG. 1 is a side plan view of a vehicle that incorporates a monitoring system in a first construction in accordance with an aspect of the present disclosure.

The present illustrated embodiments reside primarily in combinations of method steps and apparatus components related to a monitoring system configured to extrapolate a 3-dimensional ("3D") representation of a vehicle occupant and improving posture and ergonomics. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
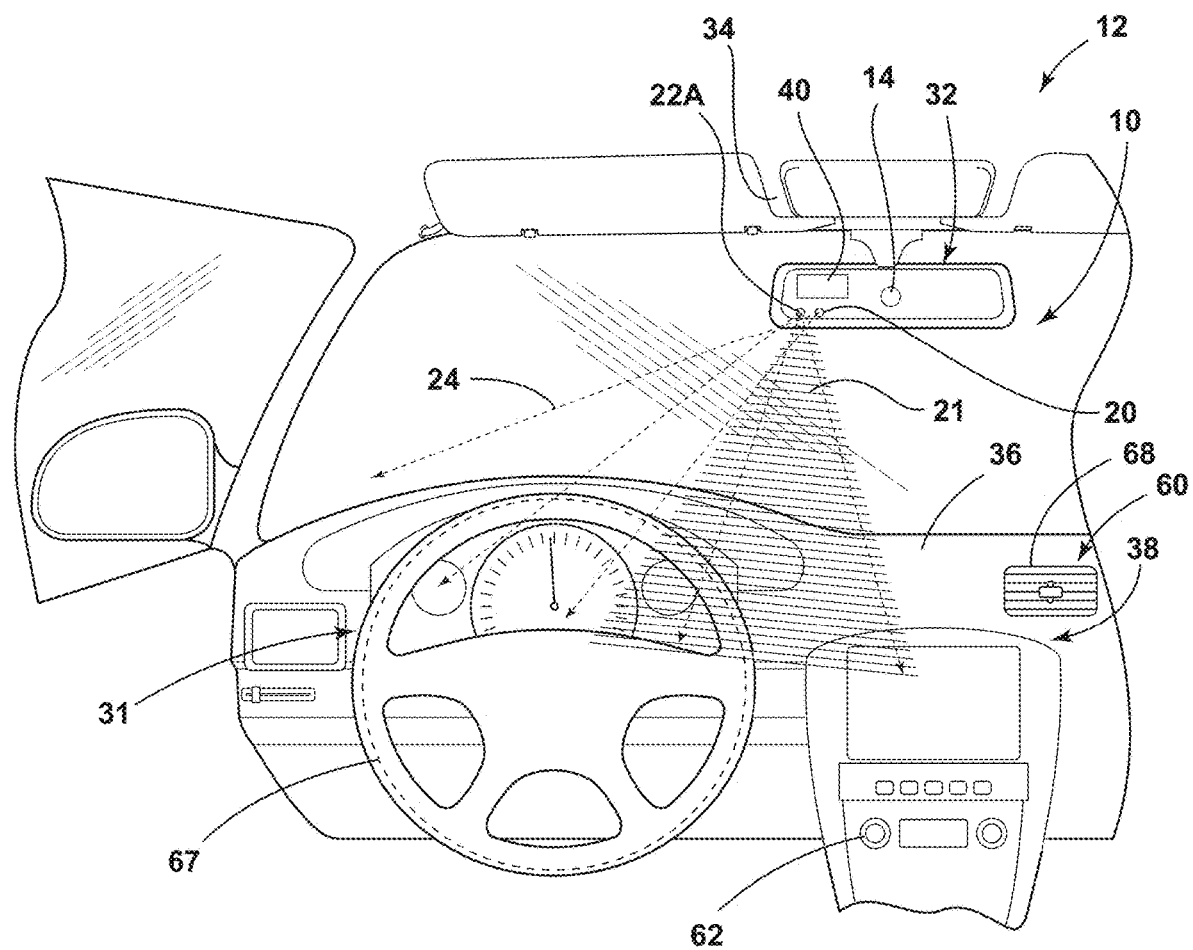
FIG. 2 is an interior view of a vehicle that incorporates a monitoring system in a first construction in accordance with an aspect of the present disclosure.
Figure 3:
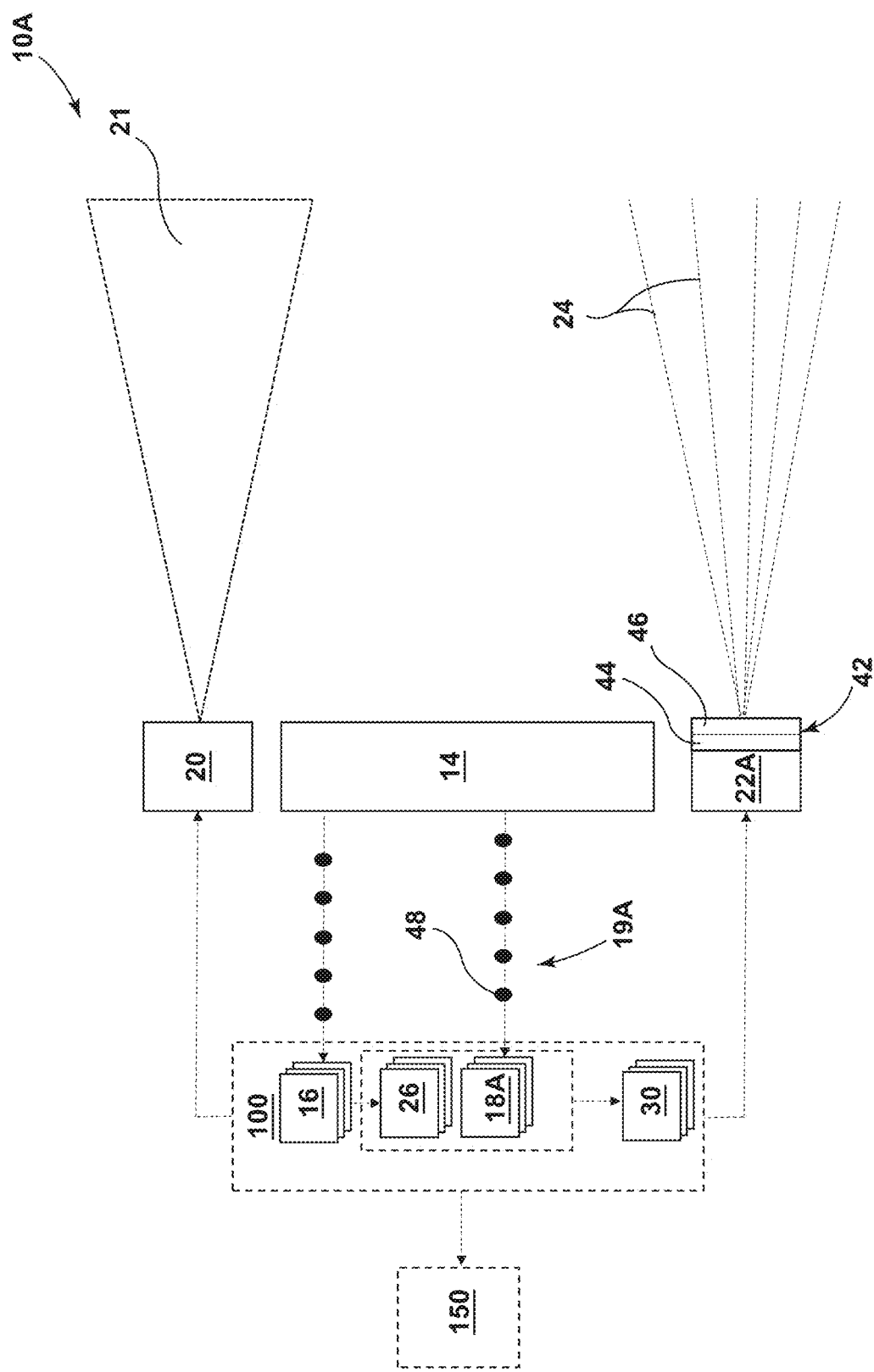
FIG. 3 is a schematic view of a monitoring system including a first construction in accordance with an aspect of the present disclosure.
Figure 4:
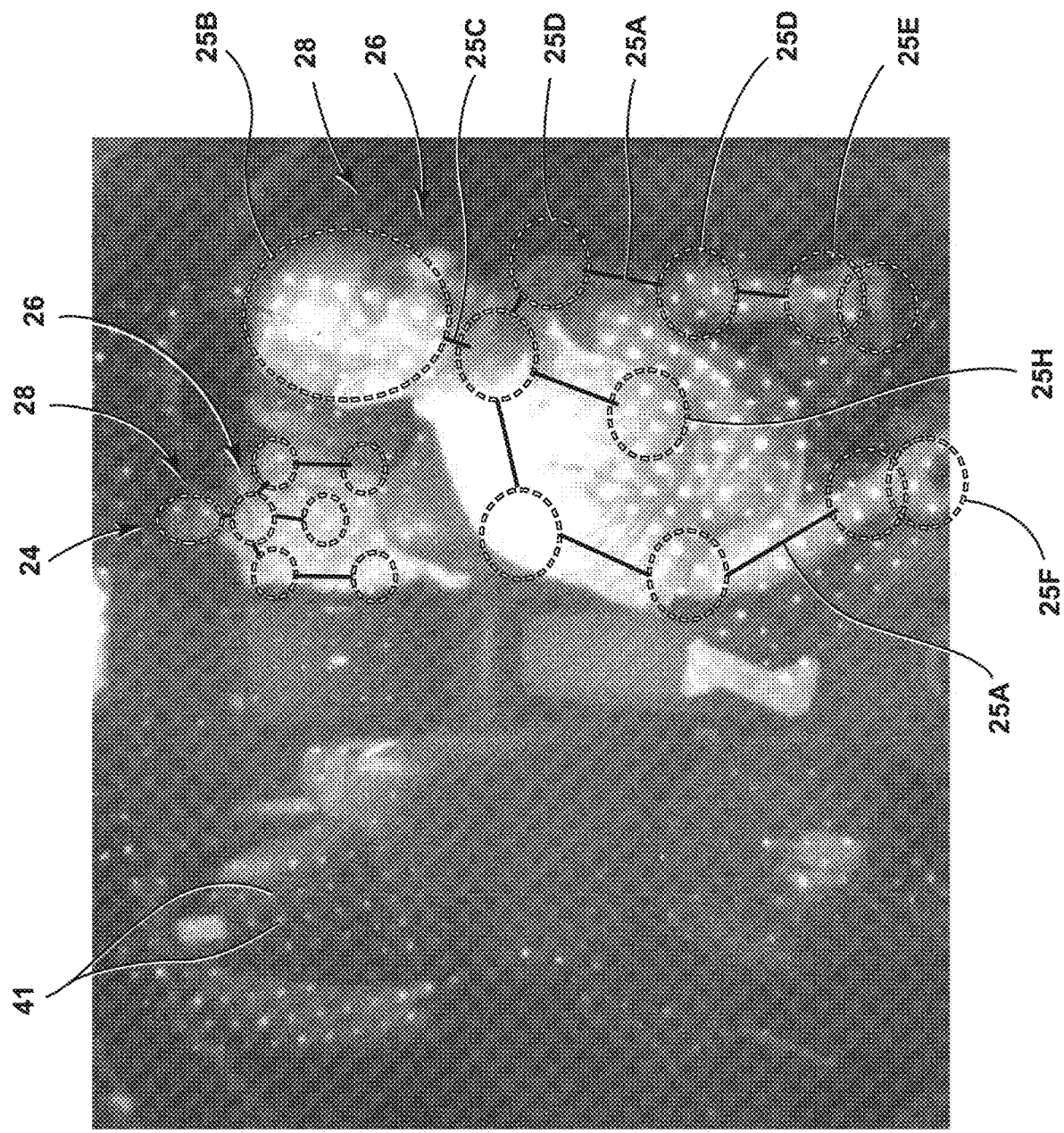
FIG. 4 illustrates a first image type overlaid over a second image type of a vehicle interior cabin that incorporates a monitoring system in accordance with an aspect of the present disclosure.
Figure 5:
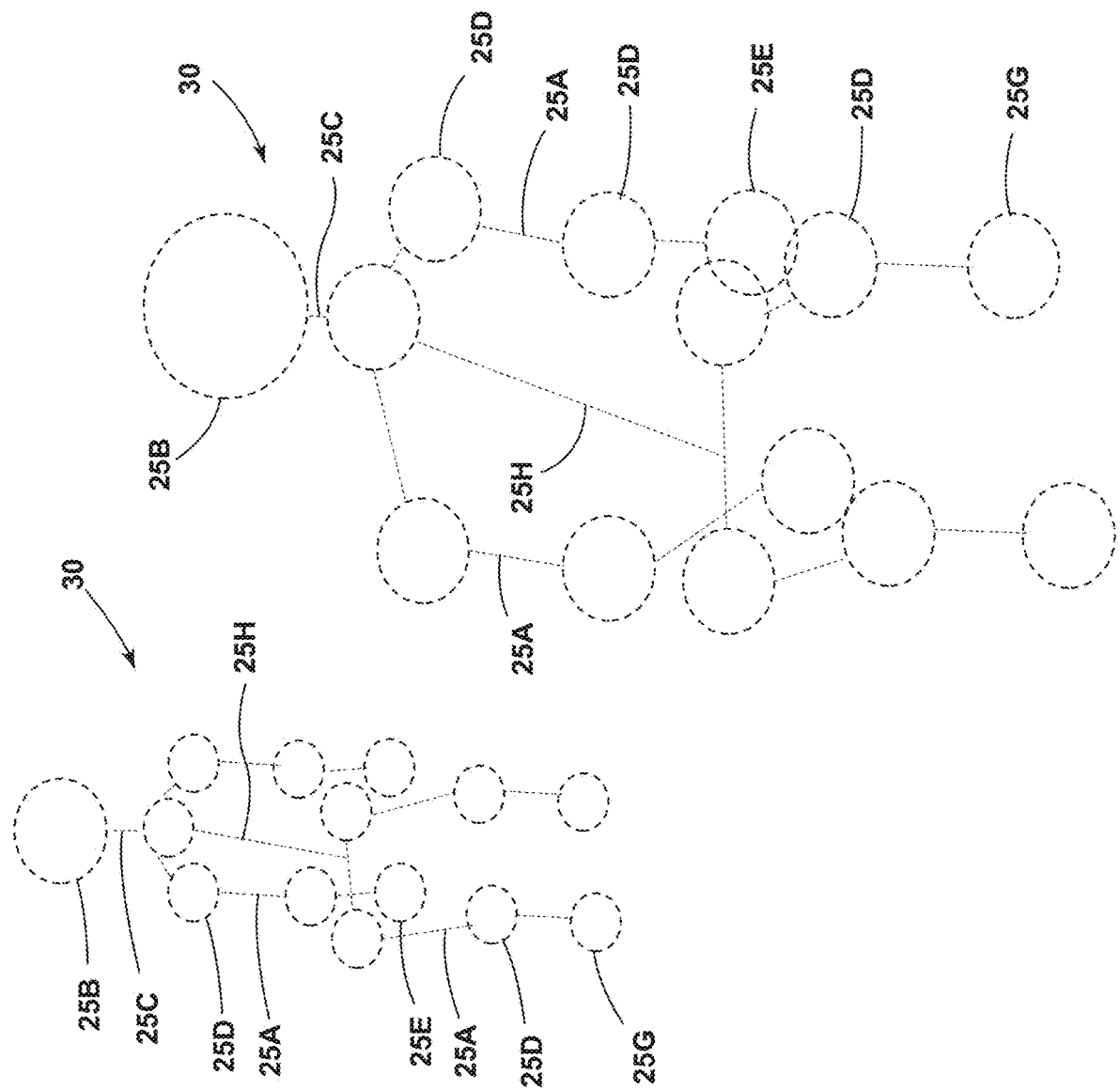
FIG. 5 is a schematic view of two 3-dimensional ("3D") skeletal representations of vehicle occupants in accordance with an aspect of the present disclosure.

Referring to FIGS. 1-6G, and 9, reference numeral 10A generally designates a monitoring system for a vehicle 12 in accordance with a first construction. The monitoring system 10A includes at least one imaging device 14 (FIG. 2) configured to capture a first image type 16 and a second image type 18A in a sequence 19A (FIG. 3). A first illumination source 20 is configured to emit a flood illumination 21 captured by the at least one imaging device 14 in the first image type 16 (FIG. 3). A second illumination source 22A is configured to emit an illumination pattern, such as a structured light illumination 24 captured by the at least one imaging device 14 in the second image type 18A (FIG. 3). A control system 100 includes at least one processor 104 that is configured to extract a 2-dimensional ("2D") skeletal representation 26 of a vehicle occupant 28 from the first image type 16, measure a depth of the 2D skeletal representation 26 with the second image type 18A, and extrapolate a 3-dimensional ("3D") skeletal representation 30 of the vehicle occupant 28 (FIGS. 4 and 5). The at least one processor 104 is further configured to generate at least one of a communication to the vehicle occupant 28 to change a posture or a signal to a vehicle control system 150 to move at least one of a position of a seat 29 or a position of a steering wheel 31.

With reference now to FIGS. 1-3, the components of the monitoring system 10A may be implemented into a variety of structures within the vehicle 12. For example, the at least one imaging device 14 and the first and second illumination sources 20, 22A may be located within a rearview mirror assembly 32, an overhead console 34, the dashboard 36, and/or other locations within an interior cabin 38 of the vehicle 12. In some embodiments, the rearview mirror assembly 32 may include an electro-optic device (not shown). For example, the electro-optic device may be a single-layer component, a single-phase component, a multi-layer component, and/or a multi-phase component that can be switched between a partially transmissive state and a partially reflective state. In some embodiments, the monitoring system 10A may include a communication module 40 (FIG. 2), for example, a display within the rearview mirror assembly 32, an audio system 62 within the vehicle 12, combinations thereof, and/or the like. In some embodiments, the vehicle 12 may include more than one monitoring system 10A. For example, one of the monitoring systems 10A may be located within the interior of the cabin 38 and another of the monitoring systems 10A may be located either on an exterior of the vehicle 12 and/or otherwise oriented to obtain the 3D skeletal representation 30 of the occupant 28 before entering the vehicle 12. In some embodiments, one of the monitoring systems 10A may be located within the interior of the cabin 38 and oriented to capture a front seating area and another of the monitoring systems 10A may be located within the interior of the cabin 38 and oriented to capture a rear seating area.

With reference now to FIG. 3, the monitoring system 10A of the first construction may be configured for a first mode of operation under the principles of structured light. In the first mode of operation, the first illumination source 20 is configured to emit the flood illumination 21 substantially within the infrared spectrum. The second illumination source 22A is configured to emit the structured light illumination 24 substantially within the infrared spectrum. In some embodiments, the structured light illumination 24 is distributed as a light spot array with a plurality of light spots 41 (FIG. 4). More particularly, the second illumination source 22A may include a least one laser diode (e.g., a plurality of laser diodes) and an optical lens 42. The optical lens 42 may include a collimation element 44 and a diffractive element 46. The collimation element 44 and the diffractive element 46 may be integrally or separately formed (e.g., via various curvatures, refraction properties, and/or the like within one or more lens 42). In some embodiments, the at least one imaging device 14 includes a single imaging device 14 that captures the first image type 16 and the second image type 18A such that the sequence 19A includes capturing the first image type 16 and the second image type 18A within alternating periods of time as designated by reference numeral 48. The periods of time 48 between capturing the first image type 16 and the second image type 18A may be less than a centisecond, less than 75 milliseconds, between 75 milliseconds and 25 milliseconds, about 50 milliseconds, or less than 50 milliseconds. In this manner, the imaging device 14 may capture a plurality of the first image type 16 and the second image type 18A in accordance with the sequence 19A. However, it should be appreciated that the at least one imaging device 14 may include two or more imaging devices 14 such that the first image type 16 and the second image type 18A are captured simultaneously in the sequence 19A. In some embodiments, 2D information about the occupant 28 may be extracted from the second image type 18A. The control system 100 (e.g., the at least one processor 104) may be configured to process the 2D information about the occupant 28 to detect locations within the second image type 18A that correspond to body parts of interest 25A-H of the occupant 28 to extract the 2D skeletal representation 26. In this manner, the process of extrapolating the 3D skeletal representation 30 from 2D information and, more particularly, the 2D skeletal representation 26 may be entirely on the basis of the second image type 18A. In this manner, it is contemplated that, the first mode of operation may be completed with only the second image type 18A (e.g., the structured light) such that the first illumination source 20 may be absent or otherwise not utilized for extracting the 2D skeletal representation 26 and, consequently, the 3D skeletal representation 30.

With reference to FIGS. 4 and 5, the first image type 16 includes 2D information about the occupant 28. The control system 100 (e.g., the at least one processor 104) may be configured to process the 2D information about the occupant 28 to detect locations within the first image type 16 that correspond to the body parts of interest 25A-H of the occupant 28, such as the limbs 25A, head 25B, neck 25C, joints 25D, hands 25E, fingers 25F, feet 25G, and torso 25H. The control system 100 (e.g., the at least one processor 104) may be configured to extract the 2D skeletal representation in accordance with the locations in the first image type 16 of the body parts of interest 25A-25H. The second image type 18A, on the other hand, includes depth information that can be overlaid on the 2D skeletal representation 26. More particularly, under the first mode of operation, the control system 100 (e.g., the at least one processor 104) may be configured to measure a depth of the 2D skeletal representation 26 with the depth information. The depth information may be obtained based on the principles of triangulation and known geometries between imaging device 14, the second illumination source 22A, and the distribution of the structured light illumination 24 (e.g., the light spot array). For example, the processor 104 may be configured to determine movement based on an outer perimeter or a center of gravity of each light spot 41. Under the first mode of operation, the imaging device 14 and the second illumination source 22A may be closely and rigidly fixed on a common optical bench structure (e.g., within the rearview mirror assembly 32 or other shared location interior or exterior of the cabin 38) and, based on the known spacing between the imaging device 14 and the second illumination source 22A (e.g., the laser diodes) and distribution of the structured light illumination 24, the light spot 41 is reflected from the occupant 28 and captured along an epipolar line, which, in turn, can be triangulated to extract a depth of the occupant 28. With reference now to FIG. 5, the depth of the occupant 28 (e.g., the body parts of interest 25A-25H) at each light spot 41 can then be used to extrapolate the 3D skeletal representation 30. Likewise, changes in depth of the body parts of interest 25A-25H can be used to extrapolate the present skeletal posture and movement of the 3D skeletal representation 30. It should be appreciated that, in some embodiments, the monitoring system 10A may not include the first illumination source 20 and the flood illumination 21 may be ambient lighting received from an environment. In this manner, in some embodiments, the at least one imaging device 14 may be configured to capture RGB information (e.g., light captured substantially in the visible spectrum) in the first image type 16 and the 2D skeletal representation 26 can be extracted from the RGB information.

Figure 6A:
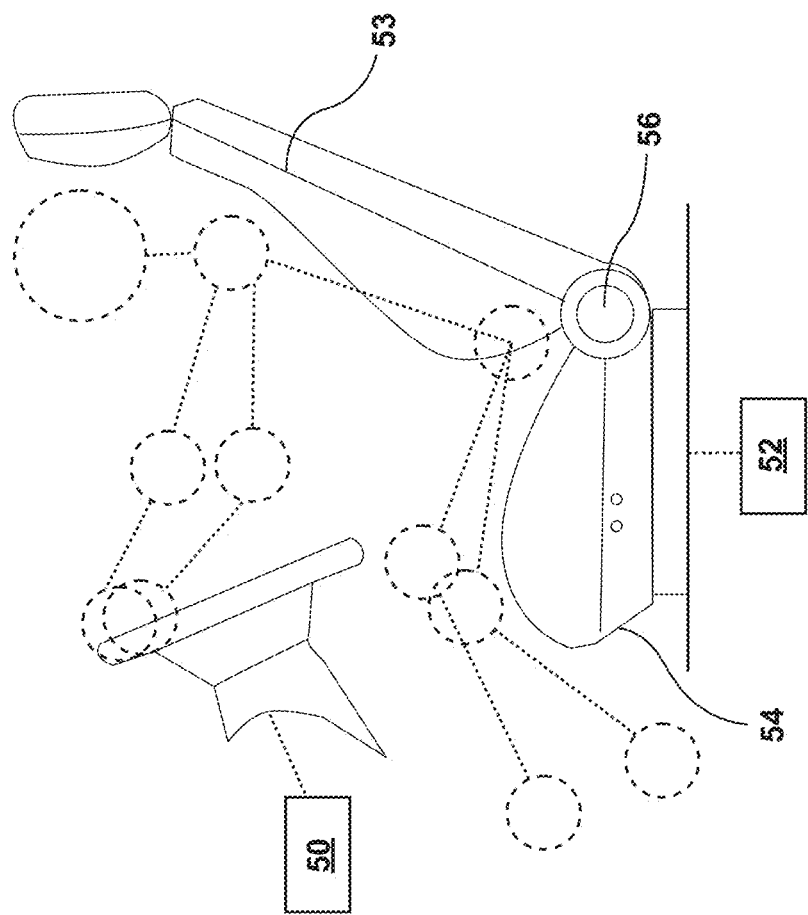
FIG. 6A is a side view of a posture of a 3D skeletal representation of a vehicle occupant sitting on a vehicle seat in accordance with an aspect of the present disclosure.

With reference now to FIG. 6A, the monitoring system 10A may be configured to recognize the size and the posture of the 3D skeletal representation 30 in order to improve ergonomics, reduce drowsiness, and/or implement other posture behaviors. In addition to extrapolating the 3D skeletal representation 30, the monitoring system 10A (e.g., the at least one processor 104) may also be configured to determine the position of the seat 29 or the position of the steering wheel 31. The 3D skeletal representation 30 of the vehicle occupant 28 provides the monitoring system 10A absolute scale information about the vehicle occupant 28. In other words, traditional 2D modeling systems may have complications obtaining absolute scale as a result of forced perspectives from 2D images that cause closer objects to appear larger than reality. In this manner, precise positioning of the 3D skeletal representation 30 within the interior cabin 38 and posture on the seat 29 can be utilized to perform the functionalities of the monitoring system 10A. For example, the control system 100 (e.g., the processor 104) may be configured to determine the precise location of the vehicle occupant 28 relative to the position of the seat 29. In one example, rather than relying on 2D information, the control system 100 (e.g., the processor 104) can determine if the vehicle occupant 28 is leaning against a backrest 53 (FIG. 1). In another example, the control system 100 (e.g., the processor 104) can determine if the vehicle occupant 28 is gripping a steering wheel 31 rather than simply holding their hands 25E between the steering wheel 31 and imaging device 14. In yet another example, the control system 100 (e.g., the processor 104) can determine a distance the vehicle occupant 28 (e.g., the head 25B, neck 25C, or torso 25H) is from the steering wheel 31.

With continued reference to FIG. 6A, the posture of the 3D skeletal representation 30 may be monitored to determine if changes to the posture would be beneficial for ergonomics, orthopedics, circulation, combinations thereof, and/or the like. For example, the posture of the 3D skeletal representation 30 may not change for a threshold period of time (e.g., a number of periods 48 within the sequence 19A). Such delays in movement may have a negative impact on orthopedics, comfort, circulation, and/or the like. In this manner, the control system 100 (e.g., the at least one processor 104) may be configured to generate a notification (e.g., on the communication module 40) to a driver or vehicle occupant and/or otherwise adjust the steering wheel 31 and/or seat 29. In other scenarios, the posture of the 3D skeletal representation 30 may include one or more drowsiness identifiers, for example, the head 25B may be slumped forward or backward. In other scenarios still, the posture of the 3D skeletal representation 30 may include one or more orthopedic identifiers related to unhealthy positioning of the body parts of interest 25A-H that may affect joint health, blood flow, breathing, and/or the like. These orthopedic identifiers may relate to improving ergonomics and, by extension, health and awareness of the vehicle occupant 28. Additional benefits of improved ergonomics include a reduction in back, shoulder, and neck strain and also reduce the occurrence of carpal tunnel syndrome in the joints 25D, hands 25E, fingers 25F, etc. Once the monitoring system 10A (e.g., the at least one processor 104) determines that changes to the posture would be beneficial, the monitoring system 10A may generate a signal to a user to manually and/or the vehicular control system 150 to automatically change at least one of the position of the seat 29 or the steering wheel 31. In a related manner, the monitoring system 10A (e.g., a second monitoring system 10A on or in the vehicle) may be oriented to obtain the 3D skeletal representation 30 of the occupant 28 before entering the vehicle 12. As such, adjustments to the seat 29 or steering wheel 31 may result in determining a size of the vehicle occupant 28 in absolute scale and adjusting the seat 29 or steering wheel 31 based on the size once the vehicle 12 is running. The steering wheel 31 may include a wheel adjustment mechanism 50 and the seat 29 may include a seat adjustment mechanism 52 that may each be adjustable via the vehicular control system 150.

Figures 6B, 6C, 6D:
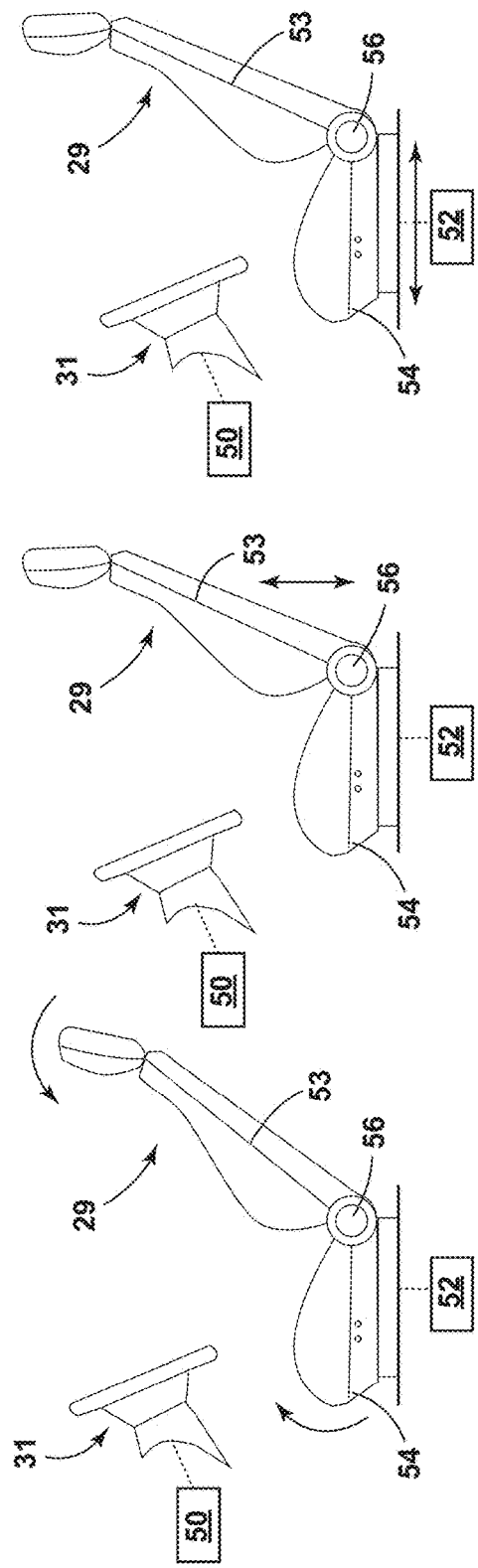
FIG. 6B is side view of a first seat adjustment in accordance with an aspect of the present disclosure.
FIG. 6C is side view of a second seat adjustment in accordance with an aspect of the present disclosure.
FIG. 6D is side view of a third seat adjustment in accordance with an aspect of the present disclosure.
Figure 6E:
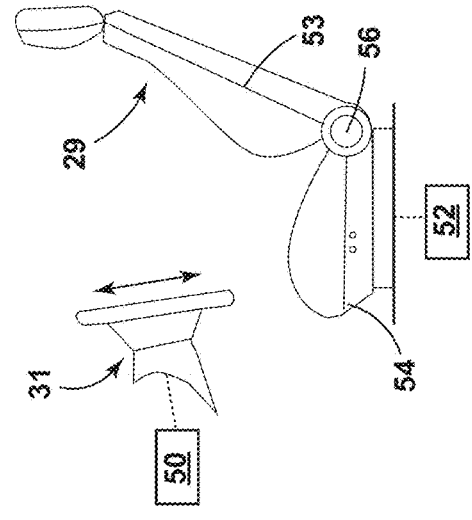
FIG. 6E is side view of a fourth seat adjustment in accordance with an aspect of the present disclosure.

With reference now to FIGS. 6B-6E, the seat adjustment mechanism 52 may include one or more mechanisms configured to move the seat 29 relative to the steering wheel 31. With reference initially to FIG. 6B, the seat adjustment mechanism 52 may be configured to articulate the backrest 53 relative to a seat cushion 54 between a variety of reclining angles by a pivot connection 56. For example, the seat adjustment mechanism 52 may pivot the seat cushion 54 relative to the backrest 53 and pivot the backrest 53 relative to seat cushion 54. With reference to FIG. 6C, the seat adjustment mechanism 52 may be configured to raise and lower the seat 29 relative to the steering wheel 31. With reference to FIG. 6D, the seat adjustment mechanism 52 may be configured to move the seat 29 towards and away from the steering wheel 31 in a forward and rearward direction. In some embodiments, the seat adjustment mechanism 52 may be configured to move the seat 29 in a cross-car direction relative to the steering wheel 31. With reference to FIG. 6E, the seat adjustment mechanism 52 may be configured to move one or more select surfaces 58 of the backrest 53 and/or the seat cushion 54. For example, a lower portion of the backrest 53 may be moved towards and away from the steering wheel 31 to provide lumbar support.

Figure 6F:
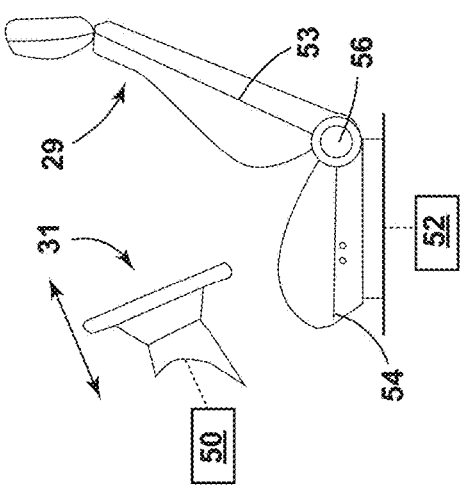
FIG. 6F is side view of a first steering wheel adjustment in accordance with an aspect of the present disclosure.
Figure 6G:
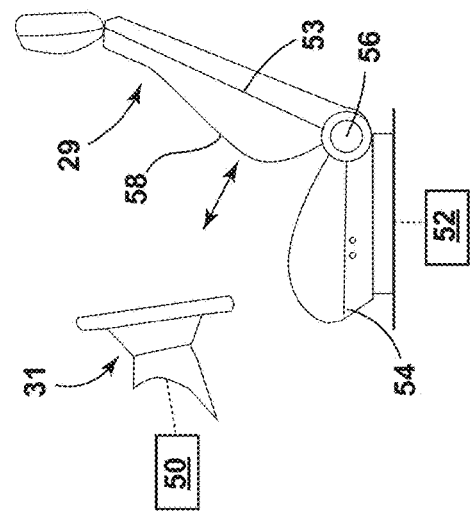
FIG. 6G is side view of a second steering wheel adjustment in accordance with an aspect of the present disclosure.

With reference now to FIGS. 6F and 6G, the wheel adjustment mechanism 50 may be configured for linear (FIG. 6F) and/or rake (FIG. 6G) movement of the steering wheel 31. With reference to FIG. 6F, the linear movement of the steering wheel 31 is relative to the seat 29 in the forward and rearward direction. With reference to FIG. 6G, the rake movement of the steering wheel 31 changes the angle of the steering wheel 31 with respect to the seat 29.

With reference back to FIGS. 1 and 2, the control system 100 (e.g., the processor 104) may be configured to adjust the seat 29, the steering wheel 31, or other features of the vehicle 12 upon determining a posture, a size, the drowsiness identifiers, or the orthopedic identifiers. For example, the other features of the vehicle 12 may include a heating and cooling system 60 and an audio system 62 that may be controlled by the vehicle control system 150 via communication by the control system 100. In some embodiments, the monitoring system 10A may be oriented to obtain the size of the occupant 28 (e.g., the 3D skeletal representation 30) before entering the vehicle 12. Upon determining the size, the control system 100 (e.g., the processor 104) may be configured to adjust the seat 29 and/or the steering wheel 31 in an ergonomic orientation. In some embodiments, upon determining that the posture includes one of the drowsiness identifiers (e.g., tilted head 25B), the control system 100 (e.g., the processor 104) may be configured to adjust the seat 29, the steering wheel 31, generate an audible alert (e.g., on the communications module or audio system 62), turn the audio system 62 on or change a volume of the audio system 62, and/or change a temperature with the heating and cooling system 60. In some embodiments, upon determining that the posture includes one of the orthopedic identifiers (e.g., holding a posture for a predetermined threshold of time), the control system 100 (e.g., the processor 104) may be configured to adjust the seat 29, the steering wheel 31, generate an audible alert (e.g., on the communications module or audio system 62), and/or change a temperature with the heating and cooling system 60. For example, the heating and cooling system 60 may include a seat warmer 65, a steering wheel warmer 67, vents 68 within the interior cabin 38, and/or the like.

Figure 7:
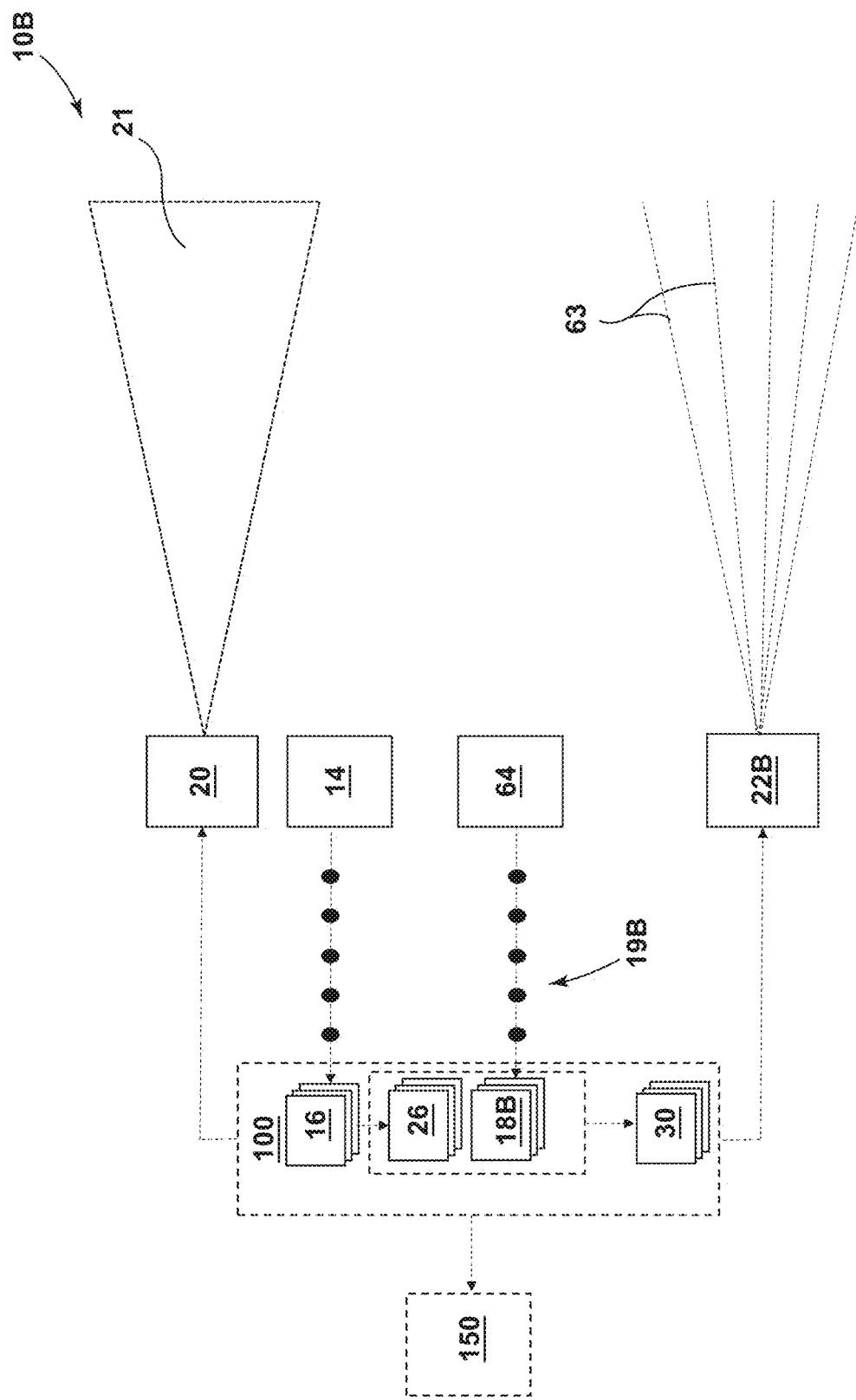
FIG. 7 is a schematic view of a monitoring system including a second construction in accordance with an aspect of the present disclosure.

With reference now to FIG. 7, a monitoring system 10B of a second construction may be configured for a second mode of operation under the principles of Time-of-Flight ("ToF"). Unless otherwise explicitly indicated, the monitoring system 10B may include all of the components, functions, and materials, and may be implemented in the same structures of the vehicle 12 as the other constructions. However, the monitoring system 10B may include a second illumination source 22B (e.g., at least one laser diode and/or LED) that is configured to emit an illumination pattern, such as a beam illumination 63 (in modulated pulses or continuously emitted). The monitoring system 10B includes at least one imaging device that includes a first imaging device 14 and a second imaging device 64 (e.g., a sensor). The first imaging device 14 is configured to capture the flood illumination 21 from the first illumination source 20 in the first image type 16, and the second imaging device 64 is configured to capture the beam illumination 63 in a second image type 18B. The control system 100 (e.g., the at least one processor 104) is configured to extract the 2D skeletal representation 26 of the vehicle occupant 28 from the first image type 16, measure a depth of the 2D skeletal representation 26 with the second image type 18B, and extrapolate the 3D skeletal representation 30 of the vehicle occupant 28.

With continued reference to FIG. 7, the control system 100 (e.g., the at least one processor 104) may be configured to extract the 2D skeletal representation in accordance with the locations in the first image type 16 of the body parts of interest 25A-25H. The second image type 18B, on the other hand, includes depth information that can be overlaid on the 2D skeletal representation 26. More particularly, under the second mode of operation, the control system 100 (e.g., the at least one processor 104) may be configured to measure a depth of the 2D skeletal representation 26 with the depth information. The depth information may be obtained based on the principles of a time difference between the emission of the beam illumination 63 in modulated pulses and the return of the beam illumination 63 back to the second imaging device 64, after being reflected from the vehicle occupant 28 (or other structure within the vehicle). The depth information may also be obtained by measuring the phase shift of the emission of the beam illumination 63 in continuous emission. In this manner, the first imaging device 14 and the second imaging device 64 may capture the first image type 16 and the second image type 18B simultaneously in a sequence 19B. It should be appreciated that, in some embodiments, the monitoring system 10B may not include the first illumination source 20 and the flood illumination 21 may be ambient lighting received from an environment. In some embodiments, the monitoring system 10B may further be configured to capture a 2D image of the interior cabin 38 (e.g., the occupant). For example, the first imaging device 14 and/or the second imaging device 64 may be configured to capture the 2D image. In this manner, the processor 104 may be configured to extract the 2D skeletal representation 26 from the 2D image rather than requiring additional sensors.

Figure 8:
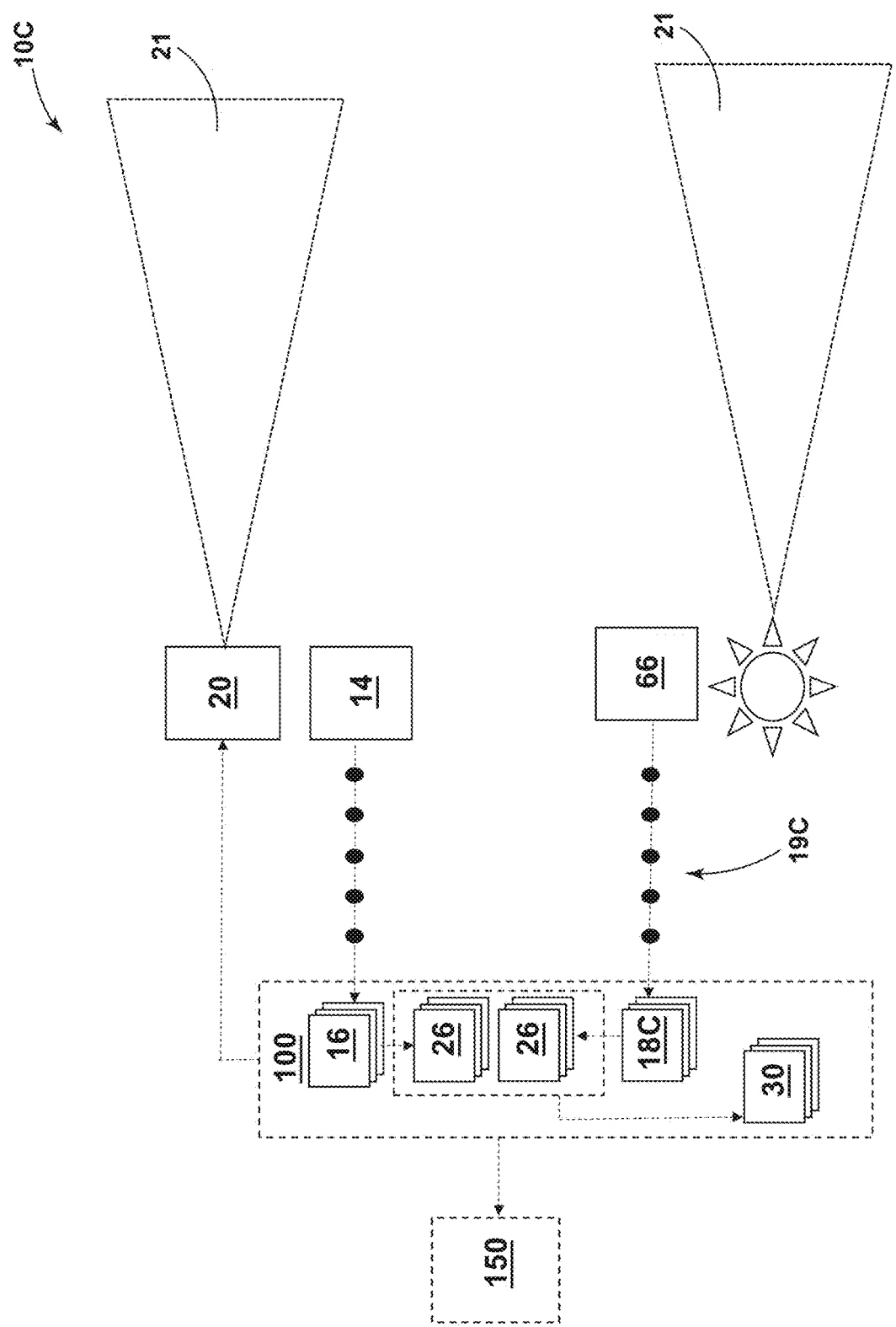
FIG. 8 is a schematic view of a monitoring system including a third construction in accordance with an aspect of the present disclosure.

With reference now to FIG. 8, a monitoring system 10C of a third construction may be configured for a third mode of operation under the principles of stereo vision. Unless otherwise explicitly indicated, the monitoring system 10C may include all the components, functions, and materials, and may be implemented in the same structures of the vehicle 12 as the other constructions. However, the monitoring system 10C may include only the first illumination source 20, and the at least one imaging device may include a first imaging device 14 and a second imaging device 66 that are both configured to capture the flood illumination 21. More particularly, the first imaging device 14 is configured to capture the first image type 16 and the second imaging device 66 is configured to capture a second image type 18C that is different from the first image type 16 in orientation. In this manner, the control system 100 (e.g., the at least one processor 104) may be configured to extract first and second orientations of the 2D skeletal representation 26 in accordance with the locations in the first image type 16 and the second image type 18C of the body parts of interest 25A-25H. More particularly, under the third mode of operation, the control system 100 (e.g., the at least one processor 104) may be configured to obtain depth information of the 2D skeletal representation 26 by measuring the position of the 2D skeletal representation 26 in the first image type 16 against the position of the 2D skeletal representation 26 in the second image type 18C along epipolar lines. The depth information may be obtained based on the principles of triangulation and known geometries between first imaging device 14 and the second imaging device 66 to extrapolate the 3D skeletal representation 30. In this manner, the first imaging device 14 and the second imaging device 66 may capture the first image type 16 and the second image type 18C simultaneously in a sequence 19C. It should be appreciated that, in some embodiments, the monitoring system 10C may not include the first illumination source 20 and the flood illumination 21 may be ambient lighting received from an environment.

Figure 9:
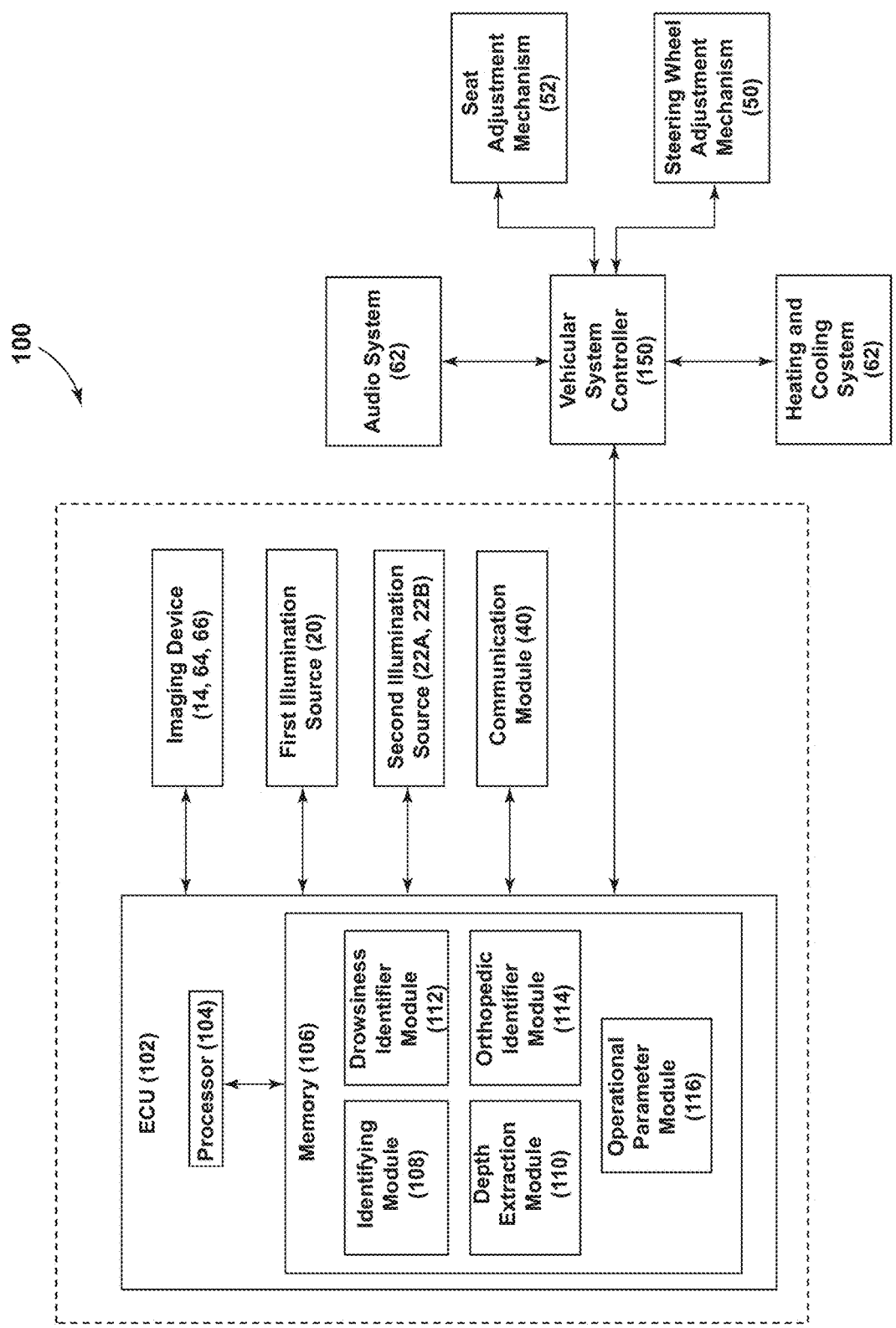
FIG. 9 is schematic view of a control system that controls functionalities of a monitoring system in accordance with an aspect of the present disclosure.

With reference now to FIG. 9, the control system 100 of the monitoring system 10A-10C may include at least one electronic control unit (ECU) 102. The at least one ECU 102 may be located in the rearview mirror assembly 32, and/or other structures in the vehicle 12. In some embodiments, components of the ECU 102 are located in both the rearview mirror assembly 32 and other structures in the vehicle 12. The at least one ECU 102 may include the processor 104 and a memory 106. The processor 104 may include any suitable processor 104. Additionally, or alternatively, each ECU 102 may include any suitable number of processors, in addition to or other than the processor 104. The memory 106 may comprise a single disk or a plurality of disks (e.g., hard drives) and includes a storage management module that manages one or more partitions within the memory 106. In some embodiments, memory 106 may include flash memory, semiconductor (solid state) memory, or the like. The memory 106 may include Random Access Memory (RAM), a Read-Only Memory (ROM), Electrically Erasable Programmable Read-Only Memory (EEPROM), or a combination thereof. The memory 106 may include instructions that, when executed by the processor 104, cause the processor 104 to, at least, perform the functions associated with the components of the monitoring system 10A-10C. The at least one imaging device (e.g., 14, 64, 66), the first illumination source 20, the second illumination source 22A-22B, and the communication module 40 may, therefore, be controlled by the control system 100. The memory 106 may, therefore, include a series of captured first image types 16, a series of second image types 18A-18C, a body part identifying module 108, a depth extraction module 110, a drowsiness identifier module 112, an orthopedic identifier module 114, and operational parameter module 116.

With reference now to FIGS. 1-9, the monitoring system 10A-10C includes the at least one imaging device (e.g., 14, 64, 66) configured to capture the first image type 16 and the second image type 18A-18C. The monitoring system 10A-10C includes a control system 100 that extracts a 2D skeletal representation 26 from the first image type and/or the second image type (18A-18C). For example, the body part identifying module 108 may include instructions for the processor 104 to detect locations within the first image type 16 and/or the second image type (18A-18C) that correspond to body parts of interest 25A-H of a vehicle occupant 28. Depth information about the 2D skeletal representation 26 can be obtained by comparing the first image type 16 and the second image type 18A-18C to extrapolate a 3D skeletal representation 30. For example, the depth extraction module 110 may include instructions for the processor 104 to determine the depth information on the basis of the principles of structured light (monitoring system 10A), ToF (monitoring system 10B), stereo vision (monitoring system 10C), or other depth calculating principles. Changes to the 3D skeletal representation 30 can be measured to obtain a present skeletal posture and movement of the 3D skeletal representation 30 in absolute scale. The 3D skeletal representation 30 may be monitored via the processor 104 by instructions contained in the drowsiness identifier module 112 or the orthopedic identifier module 114. Likewise, the absolute scale of the 3D skeletal representation 30 can be obtained within the interior cabin 38 or the exterior to the vehicle 12. Based on these factors, the processor 104 may be configured to generate a signal that includes a notification to a user and/or an instruction to the vehicular control system 150 to adjust the seat 29, the steering wheel 31, generate an audible alert (e.g., on the communications module or audio system 62), turn the audio system 62 on or change a volume of the audio system 62, actuate the seat warmer 65 or the steering wheel warmer 67, and/or change a temperature with the heating and cooling system 60.

With continued reference to FIGS. 1-9, the monitoring system 10A-10C and, more particularly, the control system 100 may be configured to automatically adapt the processes described herein to improve accuracy of the 2D skeletal representation 26 and the 3D skeletal representation 30. For example, the memory 106 may include machine learning algorithms, for example, deep learning, machine learning algorithms, tracking algorithms, and/or the like. More particularly, the control system 100 (e.g., the at least one processor 104) may be configured to modify parameters over continued usage when extracting the 2D skeletal representation 26 and extrapolate the 3D skeletal representation of the vehicle occupant 28. In some embodiments, for example, the vehicle occupant 28 may have a different baseline posture based on age, size, or medical condition such that the vehicle occupant 28 does not follow the generated communication or readjusts (steering wheel 31 and/or position of the seat 29) to a previous position after an automatic adjustment. In this manner, the control system 100 (e.g., the at least one processor 104) may accurately obtain information from occupants 28 with different posture parameters and adjust (or recommend an adjustment) the steering wheel 31 and/or position of the seat 29 accordingly. Similar methods may be applied to other functionalities of the monitoring system 10A-10C to improve accuracy and redefine parameters for occupants 28 of different sizes, shapes, medical conditions, and/or the like to improve ergonomics, posture, and attention.

The disclosure herein is further summarized in the following paragraphs and is further characterized by combinations of any and all of the various aspects described therein.

According to one aspect of the present disclosure, a monitoring system for a vehicle includes at least one imaging device configured to capture a first image type and a second image type in a sequence. A first illumination source is configured to emit a flood illumination captured by the at least one imaging device in the first image type. A second illumination source is configured to emit an illumination pattern captured by the at least one imaging device in the second image type. At least one processor is configured to extract a 2-dimensional ("2D") skeletal representation of a vehicle occupant from the first image type, measure a depth of the 2D skeletal representation with the second image type, and extrapolate a 3-dimensional ("3D") skeletal representation of the vehicle occupant. The at least one processor is further configured to generate at least one of a communication to the vehicle occupant to change a posture or a signal to a vehicle control system to move at least one of a position of a seat or a position of a steering wheel.

According to another aspect, a flood illumination and a illumination pattern are substantially within an infrared spectrum.

According to yet another aspect, an illumination pattern includes a structured light illumination and at least one processor is configured to extrapolate a 3D skeletal representation under principles of structured light.

According to still yet another aspect, an illumination pattern includes a beam illumination and at least one processor is configured to extrapolate a 3D skeletal representation under principles of Time-of-Flight.

According to another aspect, at least one processor is configured to detect that a 3D skeletal representation has been in a same posture for a threshold period of time and generate a communication to a vehicle occupant with a communications module. The communication includes at least one of an auditory or visual recommendation to change posture.

According to yet another aspect, at least one processor is configured to detect that a 3D skeletal representation has been in a same posture for a threshold period of time and generates a signal to a vehicle control system to move at least one of a position of a seat or a position of a steering wheel automatically without input from the vehicle occupant.

According to another aspect, at least one processor is configured to identify if a posture of a vehicle occupant includes a drowsiness identifier and generates an alert to the vehicle occupant that the drowsiness identifier has been identified.

According to still yet another aspect, at least one processor is configured to identify if a posture of a vehicle occupant includes a drowsiness identifier and generates a signal to a heating and cooling system to adjust a temperature within a vehicle.

According to one aspect of the present disclosure, a monitoring system for a vehicle includes at least one imaging device configured to capture a first image type and a second image type. The first image type includes a 2-dimensional ("2D") capture of a flood illumination on a vehicle occupant. The second image type includes a depth information of the vehicle occupant. At least one processor is configured to extract a 2-dimensional ("2D") skeletal representation of a vehicle occupant from the first image type, measure a depth of the 2D skeletal representation with the depth information, and extrapolate a 3-dimensional ("3D") skeletal representation of the vehicle occupant. The at least one processor is further configured to generate at least one of a communication to the vehicle occupant to change a posture or a signal to a vehicle control system to move at least one of a position of a seat or a position of a steering wheel.

According to another aspect, a depth information in a second image type is obtained under principles of stereo vision by comparing a first image type with the second image type. According to still yet another aspect, an illumination source is configured to emit a flood illumination.

According to another aspect, a flood illumination includes ambient lighting.

According to still yet another aspect, a depth information in a second image type is obtained under principles of at least one of a Time-of-Flight or structured light.

According to still yet another aspect, a processor is configured to generate a communication to a vehicle control system to move a position of a seat.

According to still yet another aspect, a processor is configured to generate a communication to a vehicle control system to move a position of a steering wheel.

According to another aspect, a processor is configured to generate a communication to a vehicle occupant to change a posture.

According to yet another aspect of the present disclosure, a monitoring system for a vehicle includes at least one imaging device configured to capture a first image type and a second image type in a sequence. A first illumination source is configured to emit a flood illumination captured by the at least one imaging device in the first image type. A second illumination source is configured to emit an illumination pattern captured by the at least one imaging device in the second image type. At least one processor is configured to extract a 2-dimensional ("2D") skeletal representation of a vehicle occupant from the first image type, measure a depth of the 2D skeletal representation with the second image type, and extrapolate a 3-dimensional ("3D") skeletal representation of the vehicle occupant. The at least one processor is further configured to recognize an orthopedic identifier related to poor posture and generate at least one of a communication to the vehicle occupant to change the poor posture or a signal to a vehicle control system to move at least one of a position of a seat or a signal to a vehicle control system to adjust least one of a seat or a steering wheel.

According to another aspect, a processor is configured to generate a communication to a vehicle control system to adjust a temperature of a seat warmer in a seat.

According to still yet another aspect, a processor is configured to generate a communication to a vehicle control system to adjust a temperature of a steering wheel warmer in a steering wheel.

According to still yet another aspect, a processor is configured to generate a communication to a vehicle control system to move at least one of a position of a seat or a position of a steering wheel.

It will be understood by one having ordinary skill in the art that constructions of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A monitoring system for a vehicle comprising:
a first imaging device configured to capture a first image type and a second imaging device configured to capture a second image type in a sequence with the first image type;
a first illumination source configured to emit a flood illumination captured by the first imaging device in the first image type;
a second illumination source configured to emit an illumination pattern captured by the second imaging device in the second image type; and
at least one processor configured to:
extract a 2-dimensional ("2D") skeletal representation of a vehicle occupant from the first image type;
measure a depth of the 2D skeletal representation with the second image type;
extrapolate a 3-dimensional ("3D") skeletal representation of the vehicle occupant; and
based on a posture of the vehicle occupant, generate at least one of a communication to the vehicle occupant to change the posture or a signal to a vehicle control system to move at least one of a position of a seat or a position of a steering wheel.

2. The monitoring system of claim 1, wherein the flood illumination and the illumination pattern are substantially within an infrared spectrum and the sequence includes capturing the first image type and the second image type substantially simultaneously.

3. The monitoring system of claim 2, wherein the illumination pattern includes a structured light illumination and the at least one processor is configured to extrapolate the 3D skeletal representation under the principles of structured light.

4. The monitoring system of claim 1, wherein the illumination pattern includes a beam illumination and the at least one processor is configured to extrapolate the 3D skeletal representation under the principles of Time-of-Flight.

5. The monitoring system of claim 1, wherein the at least one processor is further configured to:
detect that the 3D skeletal representation has been in the same posture for a threshold period of time; and
generate the communication to the vehicle occupant with a communications module, the communication including at least one of an auditory or visual recommendation to change the posture.

6. The monitoring system of claim 1, wherein the at least one processor is further configured to:
detect that the 3D skeletal representation has been in the same posture for a threshold period of time; and
generate the signal to the vehicle control system to move at least one of the position of the seat or the position of the steering wheel automatically without input from the vehicle occupant.

7. The monitoring system of claim 1, wherein the at least one processor is further configured to:
identify if the posture includes a drowsiness identifier; and
generate an alert to the vehicle occupant that the drowsiness identifier has been identified.

8. The monitoring system of claim 1, wherein the at least one processor is further configured to:
identify if the posture includes a drowsiness identifier; and
generate a signal to a heating and cooling system to adjust a temperature within the vehicle.

9. A monitoring system for a vehicle comprising:
a rearview mirror assembly including a housing and a display located within the housing;
at least one imaging device located in the housing and configured to capture a first image type and a second image type;
the first image type including a 2-dimensional ("2D") capture of a flood illumination on a vehicle occupant;
the second image type including depth information of the vehicle occupant; and
at least one processor configured to:
extract a 2-dimensional ("2D") skeletal representation of the vehicle occupant from the first image type;
measure a depth of the 2D skeletal representation with the depth information;
extrapolate a 3-dimensional ("3D") skeletal representation of the vehicle occupant; and
generate at least one of a communication on the display to the vehicle occupant to change a posture or a signal to a vehicle control system to move at least one of a position of a seat or a position of a steering wheel.

10. The monitoring system of claim 9, wherein the depth information in the second image type is obtained under the principles of stereo vision by comparing the first image type with the second image type.

11. The monitoring system of claim 10, further including an illumination source configured to emit the flood illumination.

12. The monitoring system of claim 10, wherein the flood illumination includes ambient lighting.

13. The monitoring system of claim 9, wherein the depth information in the second image type is obtained under the principles of at least one of a Time-of-Flight or structured light.

14. The monitoring system of claim 9, wherein the at least one processor is configured to generate the communication to the vehicle control system to move the position of the seat.

15. The monitoring system of claim 9, wherein the at least one processor is configured to generate the communication to the vehicle control system to move the position of the steering wheel.

16. The monitoring system of claim 9, wherein the at least one processor is configured to generate the communication on the display to the vehicle occupant to change the posture.

17. A monitoring system for a vehicle comprising:
at least one imaging device configured to capture a first image type and a second image type in a sequence;
a first illumination source configured to emit a flood illumination captured by the at least one imaging device in the first image type;
a second illumination source including an optical lens including at least one of a collimation element or a diffractive element, the second illumination source configured to emit an illumination pattern captured by the at least one imaging device in the second image type; and
at least one processor configured to:
extract a 2-dimensional ("2D") skeletal representation of a vehicle occupant from the first image type;
measure a depth of the 2D skeletal representation with the second image type;
extrapolate a 3-dimensional ("3D") skeletal representation of the vehicle occupant;
recognize an orthopedic identifier related to a poor posture; and
generate at least one of a communication to the vehicle occupant to change the poor posture or a signal to a vehicle control system to adjust least one of a seat or a steering wheel.

18. The monitoring system of claim 17, wherein the at least one processor is configured to generate the communication to the vehicle control system to adjust a temperature of a seat warmer in the seat.

19. The monitoring system of claim 17, wherein the at least one processor is configured to generate the communication to the vehicle control system to adjust a temperature of a steering wheel warmer in the steering wheel.

20. The monitoring system of claim 17, wherein the at least one processor is configured to generate the communication to the vehicle control system to move at least one of a position of a seat or a position of a steering wheel.

* * * * *